G. A. SAVILLE, Jr.
BALL BEARING SPRING.
APPLICATION FILED NOV. 25, 1919.
1,338,537.
Patented Apr. 27, 1920.
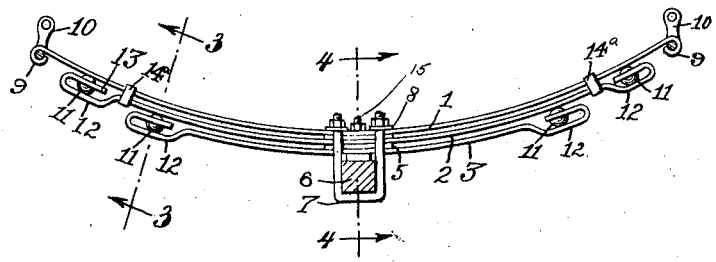
Fig. 1.
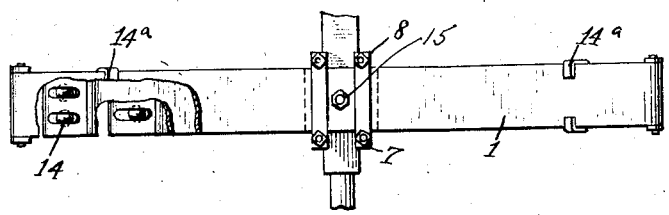
Fig. 2.
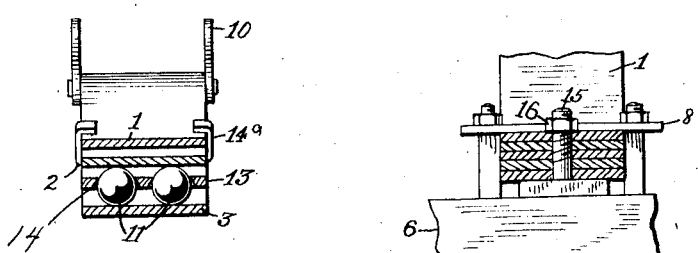
Fig. 3.
Fig. 4.
WITNESSES
Benj. Kahn
C. E. Frainn
INVENTOR
George A. Saville Jr.
BY Munn & Co
ATTORNEYS

UNITED STATES PATENT OFFICE.

GEORGE ALBERT SAVILLE, JR., OF LINCOLN, NEBRASKA.

BALL-BEARING SPRING.

1,338,537.  Specification of Letters Patent.  Patented Apr. 27, 1920.

Application filed November 25, 1919. Serial No. 340,483.

*To all whom it may concern:*

Be it known that I, GEORGE A. SAVILLE, Jr., a citizen of the United States, and a resident of Lincoln, in the county of Lancaster and State of Nebraska, have invented certain new and useful Improvements in Ball-Bearing Springs, of which the following is a specification.

My invention is an improvement in ball bearing springs, and has for its object to provide a spring especially adapted for motor vehicles, but suitable for vehicles of any character, wherein ball bearings are arranged between the laminæ or leaves of the spring at the ends of the said leaves, a bearing being arranged at each end of each of the leaves between the said end and the adjacent leaf for making the spring more flexible, reducing wear and increasing resiliency.

In the drawings:

Figure 1 is a side view of the spring constructed in accordance with the invention;

Fig. 2 is a top plan view;

Figs. 3 and 4 are sections on the lines 3—3 and 4—4 of Fig. 1.

In the present embodiment of the invention the improved spring consists of three leaves 1, 2 and 3, which are connected in spaced relation at their centers, as indicated at 4, spacing plates 5 being arranged between the leaves. The spring is connected at its center to the axle indicated at 6 by U-shaped clips 7 and clamping plates 8, the clips embracing the axle and extending along the sides of the spring, while the clamping plates are arranged above the spring.

Referring to Fig. 1, it will be seen that the leaf 1 is the longest and that each succeeding leaf is of less length than the preceding. The ends of the leaf 1 have eyes 9 which engage hangers 10 on the body or frame of the vehicle for connecting the frame to the spring.

At each end of each leaf 2 and 3 there is provided a ball bearing, indicated at 11. Each of these bearings in the present instance, consists of two balls which are supported by a cage formed from an extension of the leaf coöperating with the body of the leaf.

Referring to Fig. 1 it will be seen that each end of each leaf is offset laterally away from the body portion thereof, as indicated at 12, and the extremity of the leaf is then bent over on this opposite portion in spaced relation, being in the plane of the body of the leaf, or in alinement therewith. Each of these bent over portions 13 has slots 14 for receiving the balls 11, and it will be noticed that the slots are of such size that the balls 11 may extend on each face of the portion 13, that is, the balls engage between the offset portions 12 of the leaves and the body of the preceding leaf, the ends of the leaf 2 are clipped to the leaf 1 as indicated at 14$^a$, so that the balls at the ends of the said loop 2 are held in engagement with the face of the leaf 1.

In the operation of the improved spring it will be evident that the ends of the several leaves will move smoothly and easily upon each other, without friction, thus greatly increasing the resiliency of the spring and dispensing with the need for lubrication.

The life of the spring is lengthened and there is less liability to injury by breakage, because of the smooth fitting of the leaves upon each other. It will be noticed, referring to Fig. 4, that a threaded stem 15 is provided for connecting the spring to the axle 6. This stem passes through registering openings in the leaves and is engaged by a nut 16.

I claim:

A laminated spring comprising in combination with the leaves, of ball bearings arranged at the ends of the leaves between each leaf and the preceding leaf, and cages for the balls formed by bending back the extremities of the leaves upon the body and slotting said extremities to receive the balls.

GEORGE ALBERT SAVILLE, JR.